US011058960B2

(12) United States Patent
Metni et al.

(10) Patent No.: US 11,058,960 B2
(45) Date of Patent: Jul. 13, 2021

(54) INTERACTIVE MODULAR SENSOR SYSTEM FOR INDOOR SKYDIVING WIND TUNNELS

(71) Applicant: Skyventure International (UK) Ltd, Worcester (GB)

(72) Inventors: N. Alan Metni, Austin, TX (US); Anthony Robert Gioia, Austin, TX (US); Eric Travis Owens, Austin, TX (US); Wade Austin Lewis, Austin, TX (US); Justin Eugene Waldron, Austin, TX (US); Casey Judson Gardiner, Tampa, FL (US)

(73) Assignee: IFLY HOLDINGS, LLC, Ausstin, TX (US)

( * ) Notice: Subject to any disclaimer, the term of this patent is extended or adjusted under 35 U.S.C. 154(b) by 0 days.

(21) Appl. No.: 16/651,620

(22) PCT Filed: Nov. 16, 2018

(86) PCT No.: PCT/IB2018/001432
§ 371 (c)(1),
(2) Date: Mar. 27, 2020

(87) PCT Pub. No.: WO2019/097292
PCT Pub. Date: May 23, 2019

(65) Prior Publication Data
US 2020/0324213 A1    Oct. 15, 2020

Related U.S. Application Data

(60) Provisional application No. 62/588,071, filed on Nov. 17, 2017.

(51) Int. Cl.
*A63G 31/00*        (2006.01)
*G01P 13/00*        (2006.01)
(Continued)

(52) U.S. Cl.
CPC .............. *A63G 31/00* (2013.01); *G01P 13/00* (2013.01); *G01V 8/12* (2013.01); *A63G 33/00* (2013.01); *A63G 2031/005* (2013.01)

(58) Field of Classification Search
CPC ... A63G 31/00; A63G 2031/005; G01M 9/04; B64D 23/00
(Continued)

(56) References Cited

U.S. PATENT DOCUMENTS 5,577,981 A * 11/1996 Jarvik ................ A63B 71/0622
                                                      482/4
5,655,909 A   8/1997 Kitchen et al.
(Continued)

FOREIGN PATENT DOCUMENTS

CN    106621345 A    5/2017
JP    H01-94887 A    4/1989
(Continued)

OTHER PUBLICATIONS

International Search Report dated Jan. 31, 2019 in parent international application PCT/IB2018/001432.
Written Opinion of the International Searching Authority dated Jan. 31, 2019 in parent international application PCT/IB2018/001432.

*Primary Examiner* — Kien T Nguyen
(74) *Attorney, Agent, or Firm* — Polson Intellectual Property Law, PC; Margaret Polson; Christopher Sylvain

(57) ABSTRACT

An interactive modular sensor system for an indoor skydiving wind tunnel. The system comprises a plurality of nodes arranged around the flight chamber of the wind tunnel. The nodes have at least one sensor and at least one light source. The sensors are configured to detect user movement within the flight chamber. The light sources are configured to change appearance between at least two indicator states. A network connects the plurality of nodes. A program coordinates the activity of the nodes, whereby each of the nodes (Continued)

may be individually controlled. The program may include various modes with different user objectives and rules. Users are directed to perform or not perform actions by the light source indicator states of each node, and the sensor monitors for the occurrence of such actions. Information from multiple systems may be compiled in an inter-tunnel system. Other aspects of the system are also described.

20 Claims, 9 Drawing Sheets

(51) Int. Cl.
    *G01V 8/12*     (2006.01)
    *A63G 33/00*     (2006.01)

(58) Field of Classification Search
    USPC ...... 472/49, 50, 137; 434/34, 247, 252, 258; 73/147
    See application file for complete search history.

(56) References Cited

U.S. PATENT DOCUMENTS

| | | | | |
|---|---|---|---|---|
| 5,882,204 | A | * | 3/1999 | Iannazo .................... G01S 5/30 434/251 |
| 6,042,490 | A | | 3/2000 | Lenhart |
| 6,152,854 | A | * | 11/2000 | Carmein .............. A63B 22/025 482/4 |
| 6,929,480 | B2 | | 8/2005 | Lee et al. |
| 7,156,744 | B2 | | 1/2007 | Metni et al. |
| 2009/0312111 | A1 | | 12/2009 | Gil et al. |
| 2012/0052946 | A1 | * | 3/2012 | Yun ..................... A63B 69/004 463/32 |

FOREIGN PATENT DOCUMENTS

| | | |
|---|---|---|
| JP | H10-156047 A | 6/1998 |
| WO | 2016170365 A2 | 10/2016 |
| WO | 2017178922 A1 | 10/2017 |
| WO | 2018015766 A1 | 1/2018 |
| WO | 2018044225 A1 | 3/2018 |
| WO | 2018048814 A1 | 3/2018 |

* cited by examiner

INTERACTIVE MODULAR SENSOR SYSTEM FOR INDOOR SKYDIVING WIND TUNNELS

BACKGROUND

In wind tunnels for skydiving simulation, users are suspended by an upward airflow in a flight chamber and thereby can experience a sensation of flying or floating. An example is disclosed in U.S. Pat. No. 7,156,744 (Metni et al.). The flight chamber typically contains a sufficient volume, including both in horizontal area and vertical height, to accommodate one or more users flying therein. The side or vertical walls of the flight chamber may form circular, polygonal or other cross-sectional geometries, and are generally made of transparent materials so that observers can watch users within the flight chamber. Beginner and amateur users are often guided by facility personnel in introductory or recreational sessions. However, the growth of indoor skydiving has generally corresponded to an increase in the number of skilled users seeking more challenging and interactive experiences, beyond those typically provided in basic wind tunnel facility setups. The foregoing discussion of the related art and any limitations therewith are intended to be illustrative and not exclusive. Other limitations of the related art will become apparent to those of skill in the art upon review of the specification and drawings.

SUMMARY

The following embodiments and aspects thereof are described and illustrated in conjunction with systems, tools and methods which are meant to be illustrative, not limiting in scope. In various embodiments, one or more described problems have been reduced or eliminated, while other embodiments are directed to other improvements.

The present disclosure relates to an interactive modular sensor system for use in an indoor skydiving wind tunnel. One aspect is to augment the functionality of an indoor skydiving facility. Another aspect is to increase user interactivity with tunnel systems. Another aspect is to increase flyer and/or spectator involvement with events occurring within the flight chamber. Another aspect is to provide sensory stimulation to flyers and/or spectators with respect to events occurring within the flight chamber. Another aspect is to enhance user experience through the implementation of various program modes, such as games, training exercises, challenges, etc., which may be either recreational or competitive in nature. Another aspect is to provide a customizable modular system for a flight chamber of the wind tunnel. Another aspect is to provide modular nodes that can be mounted along and positioned at any desired location, and in any desired number, on the walls of the flight chamber. Another aspect is to provide a system which can variably control the activity of individual components thereof depending on a selected program mode, process information received from the components, and communicate instructions to the components of the interactive system based on said information received. Another aspect is to augment inter-tunnel functionality across multiple indoor skydiving facilities. Another aspect is to increase personal and/or social interaction via an inter-tunnel system.

The interactive modular sensor system comprises a plurality of nodes mounted around the wall or walls of the flight chamber of the wind tunnel. The nodes may be attached directly to the wall or walls of the flight chamber, such as by adhesive, or supported by mounting structures provided around the periphery of the flight chamber. For example, the nodes may be mounted on one or more node columns. The node columns may form electrical conduits for concurrently routing power and/or signal transmission cabling to the nodes. LED or OLED strips may be mounted along such node columns.

Each node has at least one sensor and at least one light source. The at least one sensor faces the interior of the flight chamber. The at least one sensor is configured to detect an input signal from user movements within the flight chamber and generate an output signal in response to the input signal. The at least one sensor may include a proximity sensor and a through-beam sensor. The proximity sensor detects when a user is close to the proximity sensor and generates an output signal if the user comes within a set distance of the proximity sensor. For example, the proximity sensor may be photoelectric reflective sensor. Other proximity sensors could be photo, optic, radio, or haptic based. The through-beam sensor detects a crossbeam emitted by a through-beam emitter through the flight chamber and generates an output signal if a user breaks the crossbeam. For example, the through-beam sensor may be a photoelectric sensor and the crossbeam may be provided by a laser beam. The through-beam emitter may be provided by another node arranged opposing the node with the through-beam sensor across the flight chamber. In this case, a first node includes the through-beam emitter and a second node includes the through-beam sensor. Some embodiments may have multiple crossbeams formed between through-beam sensors and through-beam emitters of opposing nodes across the flight chamber.

The at least one light source is configured to change visual appearance between at least two states. The at least two states provide visual indication to users in the flight chamber. For example, the at least one light source may change color between the at least two states. In other embodiments, the at least one light source may be turned on/off, blink versus have constant emittance, or include any other suitable changes, between the at least two states. The at least one light source may include one or more LED or OLED strips in some embodiments.

Each node may comprise a node housing for containing, mounting, and protecting components thereof. Visual indicator portions of the housings can be configured to allow light emitted by the at least one light source to convey visual indication to any flyers within the flight chamber and/or spectators outside the flight chamber watching such flyers. For example, a visual indicator portion of the housing may comprise a diffusion plate and a cover plate arranged over the diffusion plate. The diffusion plate diffuses the field of light generated by the light source inside the housing to create an even or substantially even exterior glow effect. The cover plate may further modify the appearance of the light for aesthetics (e.g. cutouts forming commercial logos or ornamental designs).

The system comprises a network communicatively connecting the plurality of modular nodes to a central processor. The central processor executes a program which coordinates the activity of the plurality of nodes. In some embodiments, a plurality of modular controllers may be provided to communicatively interface between the central processor and the components of the nodes, instead of the nodes communicatively interfacing directly with the central controller. The program can determine and control how nodular elements of the system behave. For example, the program may control and change the at least two states of the light sources of the plurality of nodes in response to output detection signals received from the sensors of the plurality of nodes. The program may include multiple program modes having different user objectives or rules. Since the modular nodes are individually controllable, a wide variety of different games, challenges, training exercises, competitions, and the like may be realized using the system. The central controller is connected to a user terminal which provides an interface for a person to run the program and select a program mode.

The network may comprise physical and/or wireless connections between the plurality of nodes and the central processor. In wireless or partially wireless embodiments, for example, the nodes can include a transmitter and receiver for wireless signal transmission over the network. Transmitters can be connected to at least the sensors of the nodes to communicate information regarding sensor triggering events detected within the flight chamber. Receivers can be connected to at least the light sources of the nodes to communicate information regarding control commands between the at least two indicator states. In this case, the nodes may be provided with an internal power source to eliminate the need for running cabling to the nodes.

In using the system, a method may comprise the steps of initiating the program via user input into a user terminal connected to a central controller; communicating, over the network, a first signal from the central controller to a first node selected by the program; activating, via the first signal, a light source of the first node; and changing the appearance of the light source of the first node in response to a sensor of the first node detecting user movement within the flight chamber. In further steps, the method may comprise communicating, over the network, a second signal from the first node to the central controller, the second signal generated in response to the sensor of the first node detecting user movement within the flight chamber; selecting, via the program, a second node based on receipt of the second signal; communicating, over the network, a third signal from the central controller to the second node selected by the program; and activating, via the third signal, a light source of the second node. For example, the light source of the first node may direct the user to activate that node by coming within a set distance of a proximity sensor of the node, and once the proximity sensor is triggered by the requested user movement, then the light source of that node may change appearance to indicate that the node has been satisfied, and the light source of another node may provide new instructions to the user. Of course, the light source may instead direct the user to not activate that node depending on program mode. Through-beam sensors and emitters can be utilized in a similar manner (break the crossbeam; do not break the crossbeam). The program may track and record user metrics via counters, timers, etc.

Some embodiments of the system may comprise one or more supplemental sensory components to augment interaction with users in the flight chamber and/or observers in the facility. For example, one or more haptic devices worn by flyers, display screens, speakers or earphones/earbuds can be incorporated. Likewise, the system may also incorporate media capture aspects, such as by integrating one or more cameras into the nodes or sight rings into node columns. The cameras may be functionally controlled by the system with respect to photo and video capture, or independently controlled yet still benefit from system resources (e.g. mounting structures, power supply, cable routing, etc.).

In further embodiments, an interactive modular sensor system of an individual tunnel facility may be incorporated into an inter-tunnel system including other tunnel facility locations. The inter-tunnel system comprises a network connecting multiple intra-tunnel systems. The inter-tunnel system compiles and stores information from each of the intra-tunnel systems. For example, a database may receive data from, and distribute compiled data to, the various intra-tunnel systems. Database management system software can facilitate the storage, retrieval, distribution and update of this data. User interfaces can enable users to access and interact with the compiled information. User interfaces may include websites, smartphone applications, and/or wind tunnel facility displays, for example. For example, users may be able to view and track their personal scores, performance metrics, or any other stored pieces of data. The system may also incorporate one or more social aspects such as user profiles/messaging, the sharing of flyer rankings/scores, etc. Further, competitions or other events can be held and coordinated across multiple wind tunnel locations in substantially real-time using the inter-tunnel system.

In addition to aspects and embodiments described above, further aspects and embodiments will become apparent by reference to the accompanying drawings and the detailed description forming a part of this specification.

BRIEF DESCRIPTION OF THE DRAWINGS

This disclosure is described hereinafter with reference to the following figures.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

Figure 1:
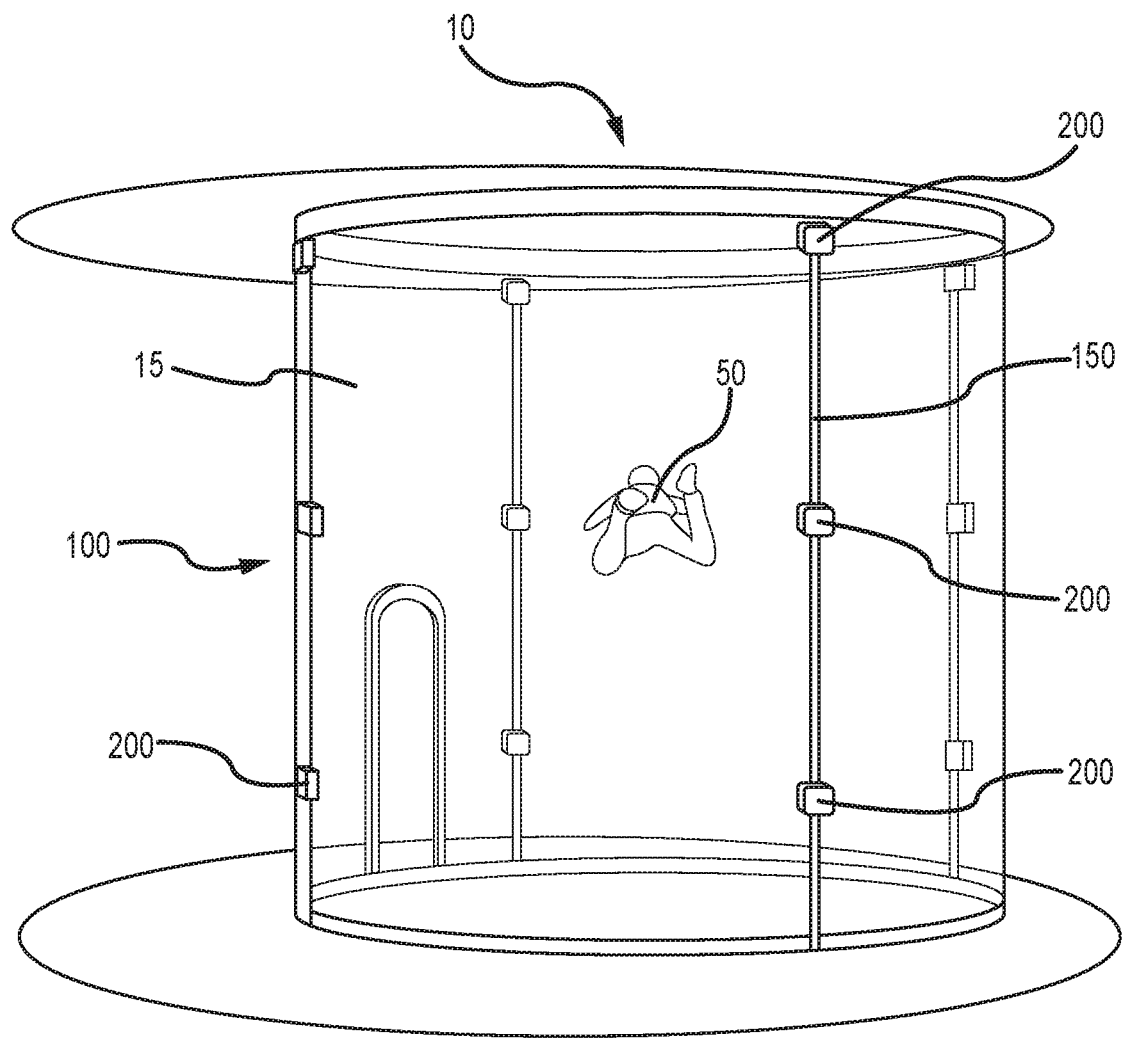
FIG. 1 shows a perspective view of a wind tunnel flight chamber including an embodiment of the interactive modular sensor system comprising a plurality of nodes mounted to node columns.

FIG. 1 shows a user 50 being suspended by an upward airflow within the flight chamber 10 of a vertical wind tunnel including an interactive modular sensor system 100 according to the present disclosure. The system 100 comprises a plurality of nodes 200 arranged at various locations around the flight chamber 10. In the depicted embodiment, the nodes 200 are mounted along the exterior surface of the flight chamber walls 15, which prevents the nodes 200 from obstructing the airflow (turbulence) and generating heat (drag) inside the flight chamber 10. The nodes 200 could instead be mounted on the interior surface of the flight chamber walls 15, integrated into the structure of flight chamber walls 15, or include any combination of exterior, interior, and integral mounting, within the scope and spirit of the present disclosure. Each node 200 may be modular in design and therefore capable of operating independently of the other nodes 200. Accordingly, any number of nodes 200 may be placed at any number of locations around the flight chamber 10 depending on the embodiment and intended application of the system 100. The nodes 200 may be configured for detachment from and reattachment to the flight chamber walls 15 in some embodiments, thereby allowing the setup of the system 100 to be modified by adding, removing, and/or changing the location of nodes 200 as desired. With respect to intra-tunnel system architecture, the interactive modular sensor system 100 comprises the plurality of nodes 200, a central controller or processor 300, and a user terminal 400 communicatively connected via a network 500 (see FIGS. 8 through 13). In some embodiments, the system 100 further comprises modular controllers 600 which mediate communication between the nodes 200 and the central controller 300 (see FIGS. 8 through 11).

Figure 2:
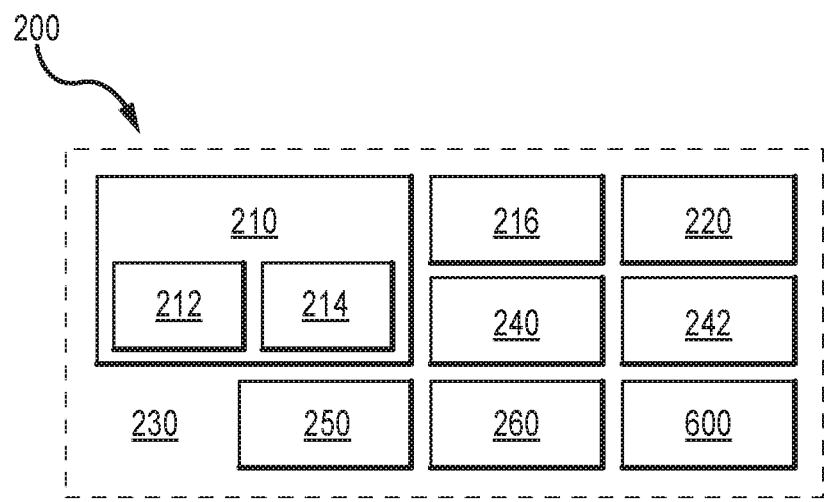
FIG. 2 shows a schematic diagram of various possible components for a node of the interactive modular sensor system.

FIG. 2 shows a schematic diagram of a node 200 with multiple components; although not all of the depicted components are necessarily present depending on the embodiment, as further described herein. Each node 200 comprises at least one sensor 210 and at least one light source 220. The at least one sensor 210 faces the interior of the flight chamber 10. The at least one sensor 210 may be any type of sensor capable of detecting an input signal from a user 50 within the flight chamber 10, and producing an output signal in response to the user input signal. An output signal from the at least one sensor 210 is communicated to the central controller 300 or a modular controller 600 for processing, and could also be diverged for direct communication with the light source 220. For example, the at least one sensor 210 may be connected to the central controller 300 or modular controller 600 via cabling, or connected to a node transmitter 240 which then wirelessly transmits the signal to a receiver connected to the central controller 300 or modular controller 600. The at least one sensor 210 may be an optical (e.g. camera), light (e.g. photoelectric), radio (e.g. close-range proximity), vibrational (e.g. sonic), touch (e.g. haptic) based sensors, to name a few examples. The at least one sensor 210 could be an RFID reader with the input signal being provided by an RFID chip or tag attached to the user 50. Each node 200 may have more than one sensor 210 of the same or different type(s), and the sensors 210 of different nodes 200 may be of a different number, type or combination thereof with respect to other nodes 200. The scope of the present disclosure is not limited by the specific number or type of sensor(s) used, or the type of user input signal(s) being detected, at the nodes 200 of the system 100. The at least one sensor 210 includes a proximity sensor 212 and a through-beam sensor 214 in the embodiments of FIGS. 3 and 4.

Any suitable type of proximity sensor 212 may be used that is able to detect when the user 50 contacts or is otherwise sufficiently close (depending on the desired triggering event performed by the user 50 that will register as an input signal and generate an output signal) to the point or area of the flight chamber 10 corresponding to that particular node 200. In the depicted embodiments, for example, the proximity sensor 212 is an eye-safe, laser-based, DC 10-24V photoelectric reflective sensor, which can be adjusted to trigger at various distances from the light emission/reception point of the sensor 212. This sensor 212 acts in a beam-break fashion, wherein a light beam is emitted into the flight chamber 10 and once a physical body or object—such as a user 50—breaks the beam at or within the maximum distance set by the sensor focal point (the input signal), the sensor 212 will detect light reflected from the physical body or object and produce an electrical signal which communicates that a triggering action has occurred (the output signal). It should be appreciated that the surface curvature, thickness, and/or material composition (e.g. type of glass or polymer) of the flight chamber walls 15 may affect the calibration of the sensor 212 for achieving a desired detection distance. Some embodiments may have an effective sensor focal point radially positioned a certain distance from the inside surface of the flight chamber wall 15, to reduce the risk of injury or structural damage from users 50 hitting the wall when trying to activate a sensor, as well as the potential accumulation of oils, dirt, or other debris on the flight chamber wall 15 at that location from user contact (which could impact the effectiveness of the sensor 212 by interfering with emissions and reflections). For example, the sensor focal point may be provided approximately 6 in (15 cm) or more from the interior surface of the flight chamber wall 15. Therefore, the vertical position, horizontal position and angle of the sensor 212 of each node 200 may be selected or adjustable relative to the outer surface of the flight chamber wall 15 to achieve a desired effective sensor focal point. For example, the sensor 212 could be moveably mounted within a node housing 230. Likewise, the position and orientation of the node housing 230 may be adjusted or adjustable relative to the outer surface of the flight chamber 10 to achieve a desired effective sensor focal point. Additionally, the sensor 212 itself may include focal point adjustment capability/functionality to vary the detection distance, such that the physical orientation of the sensor 212 and/or node housing 230 does not need to be adjusted to achieve a desired effective sensor focal point.

Figure 3:
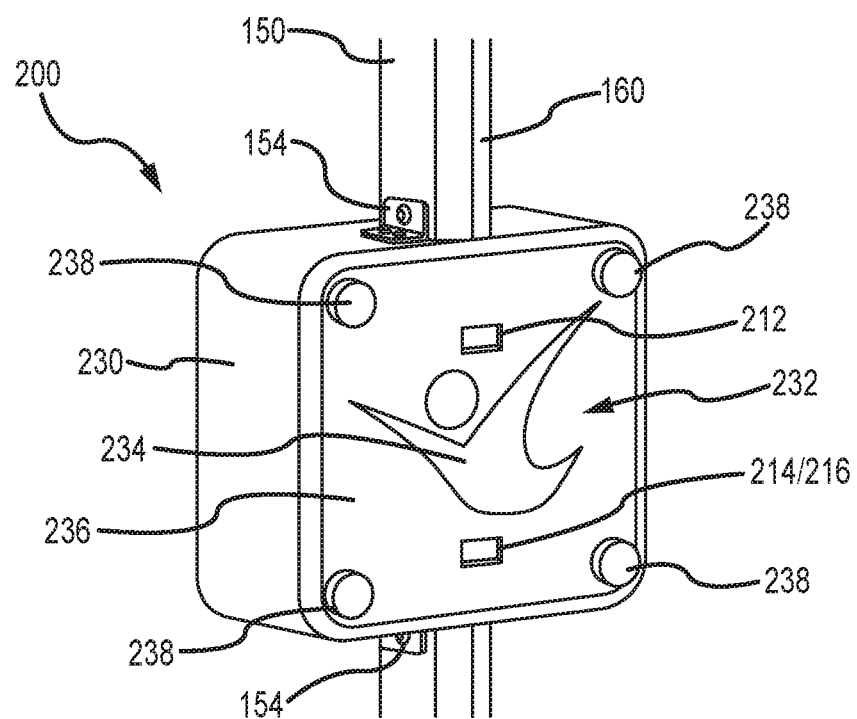
FIG. 3 shows an isolated view of a node of FIG. 1.
Figure 4:
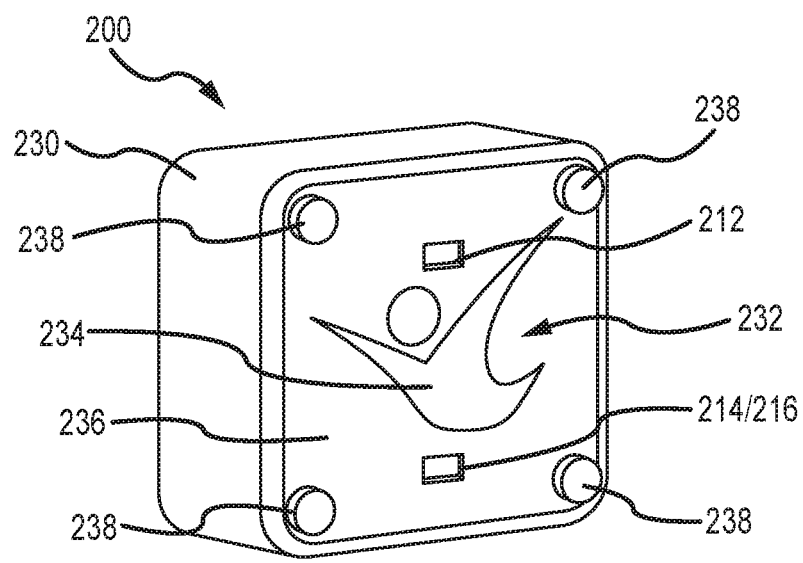
FIG. 4 shows a wireless embodiment of the node of FIG. 3, wherein the node is not mounted to a node column.
Figure 5:
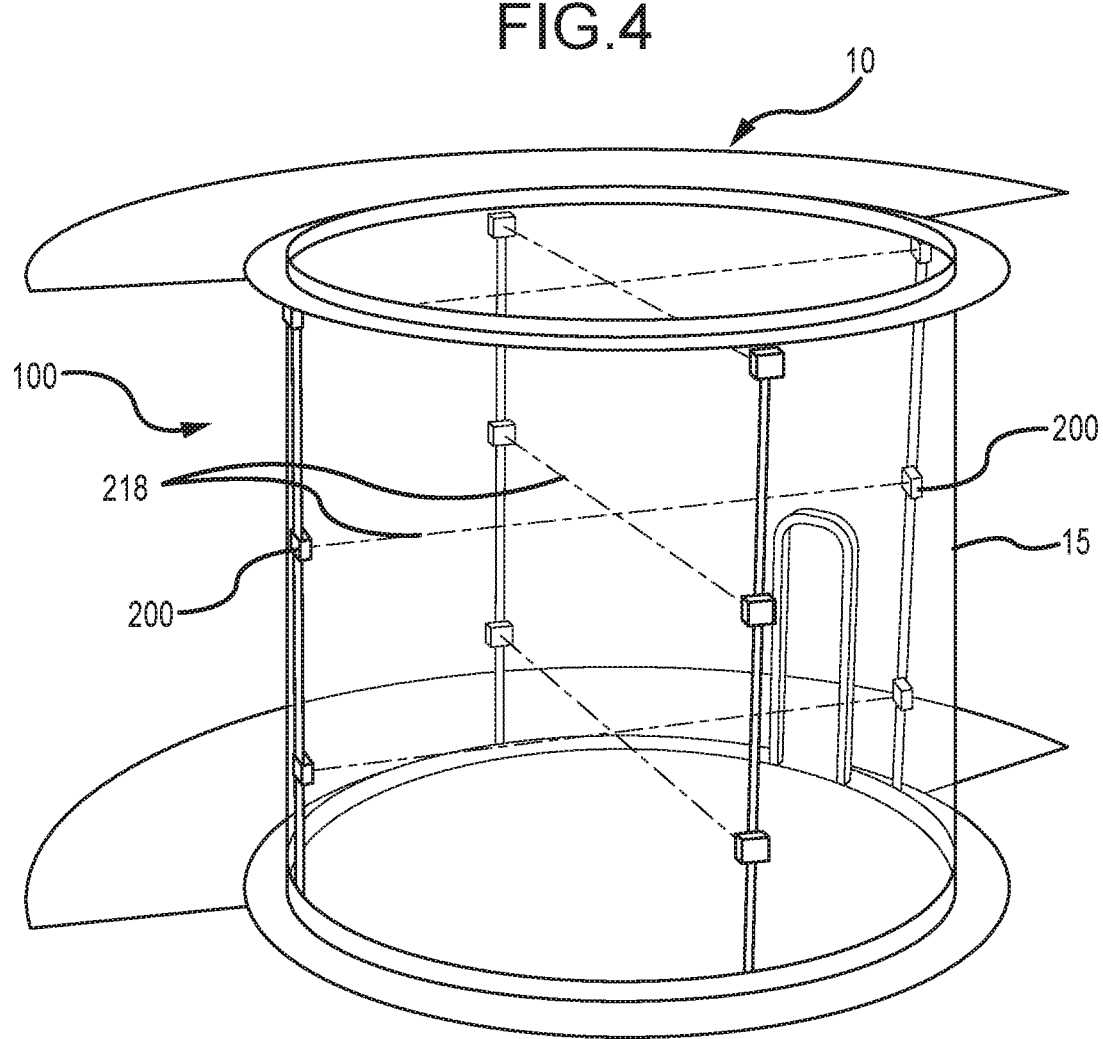
FIG. 5 shows the wind tunnel flight chamber of FIG. 1 with crossbeams illustrated between paired nodes of the interactive modular sensor system.

The through-beam sensor 214 of the node 200 is configured to detect and monitor a through-beam or crossbeam 218 projected across the flight chamber 10 by a through-beam emitter 216 of another node 200 arranged on the other side of the flight chamber 10 (see FIG. 5). Therefore, at least two nodes 200 are positioned along the flight chamber wall 15 to form a pair of nodes configured to emit and receive, respectively, the crossbeam 218 through the flight chamber 10. These paired nodes 200 may be positioned to form the path of the crossbeam 218 at various locations and/or angles through the flight chamber 10 as desired. Further, multiple crossbeams 218 may be provided by any number of pairs of nodes 200. If one of the crossbeams 218 is broken by a body or object—such as a user 50—within the flight chamber 10 (user input signal), the through-beam sensor 214 of the receiving node 200 will detect said interruption and this information may then be communicated to the central controller 300 or modular controller 600 (sensor output signal). The central controller 300 or modular controller 600 may also determine and control operation of the through-beam emitter 216. The crossbeam 218 may be a light-based beam (e.g. laser, collimated light); the term "light" here not necessarily referring only to visible light since other wavelengths of light may be used as well. Therefore, the light-based beam 218 could be either visible to users 50 or not as desired (e.g. an interactive user element versus passively tracking user movement). For example, a first node of the paired nodes 200 may have a laser emitting device 216 which projects a laser beam 218. A second node of the paired nodes 200 may have a photoelectric or photo-optic sensor 214 for detection of the crossbeam 218. In FIGS. 3 and 4, the element labeled "214/216" corresponds to the laser emitting device 216 for the first and to the laser sensor 214 for the second of the paired nodes 200. Other embodiments may use a non-laser, collimated light beam 218 in the same manner. If using laser-based crossbeams 218, care should be taken to avoid potential eye damage to users 50 inside the flight chamber 10 from the laser beam 218, such as providing protective eyewear or selecting a laser emitting device which is unlikely to cause eye damage. A non-visual crossbeam 218 could also be emitted and detected, with a separate visual indicator (e.g. laser) identifying the location of the non-visual crossbeam 218, or the light sources of the nodes 200 providing visual indication (e.g. displaying a particular color) that the crossbeam 218 is being formed between the two nodes 200. Accordingly, any suitable linear sensor pathway between two nodes 200 through the flight chamber 10 may be used to form a "beam" or line across the flight chamber 10 and detect disruptions thereto.

The light source 220 provides visual indication to users 50 within the flight chamber 10, as described in more detail below with respect to operation of the system 100. Any suitable type of light source 220 may be used that can change its visible appearance between at least two indication states, in response to control signal communications from the central processor 300 or modular controller 600, or in response to an input signal being detected or not being detected by the at least one sensor 210, depending on the embodiment. For example, the light source 220 may comprise one or more LEDs configured to change color or blink rapidly (or both) to provide visual direction to the user 50. The light source 220 could also be an incandescent bulb configured to turn on/off when its node 200 has been activated or deactivated, respectively. The scope of the present disclosure is not limited by the specific type of light source 220 used or how the visual indication provided by the light source 220 is altered between at least two different visual states. In the depicted embodiments, the light source 220 comprises 24V RGB LED strips which can be either common-anode or common-cathode. This configuration uses common-anode, with a relay-switch controlled grounding of each particular color pathway, and four "short" strips of LEDs are positioned to project an internal light field within the node housing 230 that is diffused via diffusion plate 234.

Referring still to FIGS. 2 through 4, each node 200 may comprise a node housing 230 for containing, mounting and protecting the at least one sensor 210, light source 220, and any other internal components, as well as connections and circuitry therefor. The housing 230 includes a visual indicator portion 232 configured for the light source 220 to provide or convey visual indication to users 50 located in the flight chamber 10. The housing 230 may also include a visual indicator portion 232 configured for the light source 220 to provide or convey visual indication to spectators located outside the flight chamber 10 in observing the progress of the flyer 50 using the system 100. The visual indicator portion 232 allows light emitted by the light source 220 inside the housing 230 to exit the interior of the housing 230 in a visibly apparent manner. For example, the visual indicator portion 232 may be wholly or partially open, transparent, and/or translucent. In the depicted embodiment, the visual indicator portion 232 comprises a diffusion plate 234 and a cover plate 236 arranged over the diffusion plate. For example, the diffusion plate 234 may be an acrylic panel that diffuses the field of light generated by the light source 220 inside the housing 230 to create an even or substantially even exterior glow effect. The cover plate 236 may be opaque with one or more cutouts (e.g. commercial logos or aesthetic designs) that further modify the appearance of the light through the diffusion plate 234. The diffusion plate 234 and cover plate 236 also have apertures to accommodate any components for the at least one sensor 210. Of course, the entire housing 230 could also be constructed of transparent or translucent material as well, in which case the visual indicator portions 232 would not form an identifiably distinct element of the housing 230. Node transmitters 240 and receivers 242 may be arranged within, or on the outside of, the housing 230 for wireless network connectivity of the node 200 (see also FIG. 7).

Figure 6:
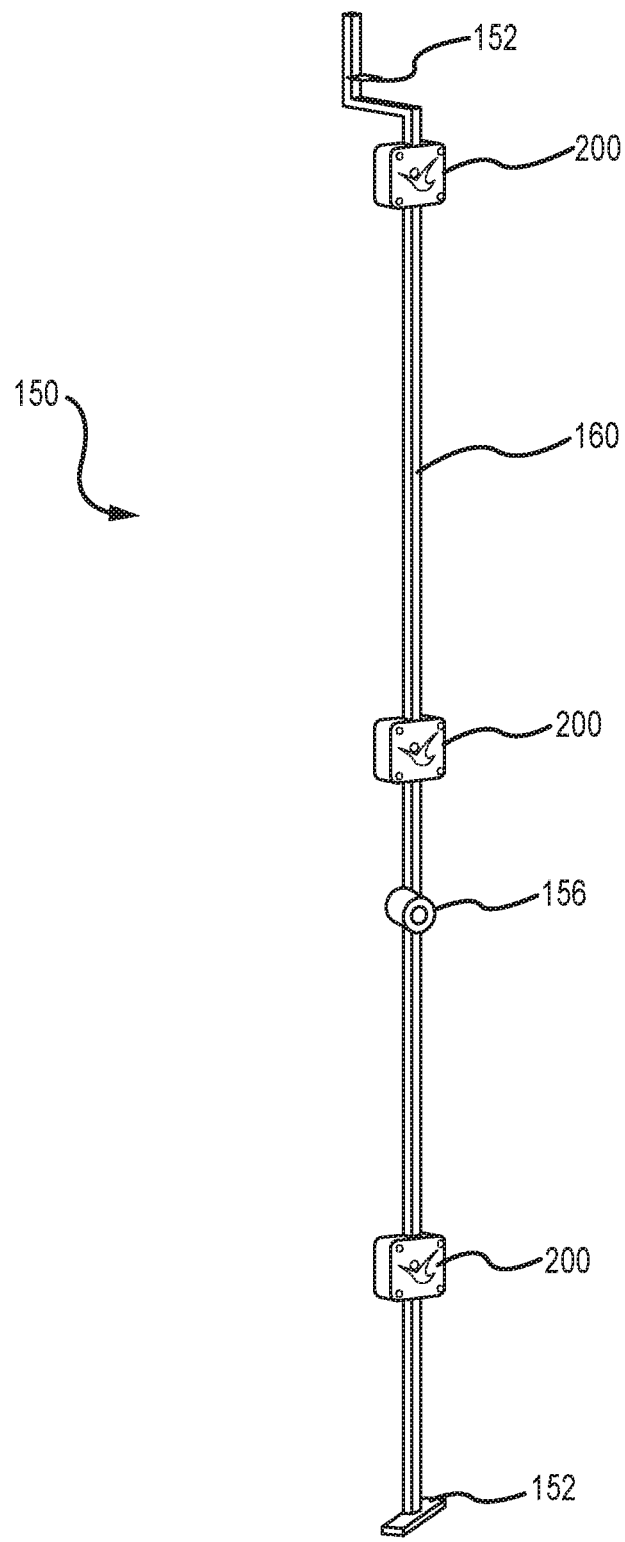
FIG. 6 shows an isolated view of a node column of FIG. 1.

The plurality of nodes 200 may be directly or indirectly mounted along the flight chamber walls 15 by any sufficiently secure type of attachment. In some embodiments, the nodes 200 are securely mounted to one or more structures provided around the periphery of the flight chamber 10. For example, the system 100 may have one or more node columns 150 (see FIG. 6). Each node column 150 forms a structure or framework for mounting and supporting nodes 200 thereon. The node columns 150 may be secured to the floor and/or ceiling next to the flight chamber 10 via mounting brackets 152. The nodes 200 in turn may be secured to the node column 150 via mounting brackets 154 (see FIG. 3). Additionally, the node columns 150 may be configured as electrical conduits for protecting and concurrently routing power and/or signal transmission cabling to their respective nodes 200. In the depicted embodiment of FIG. 1, the system 100 has four node columns 150 with each node column 150 having three nodes 200. Of course, a different number of nodes 200 on each node column 150, a different number of node columns 150, and/or a different arrangement of the node columns 150 around the periphery of the flight chamber 10 may also be used. In other embodiments, the nodes 200 may be mounted to and supported by the flight chamber walls 15 via load-bearing structural components (e.g. bolts) or strong adhesives (e.g. glues). Attachments that do not require structural alteration of the flight chamber walls 15 or leave permanently visible remnants on the flight chamber walls 15 when removed, such as removeable adhesives, may be preferable in certain embodiments, particularly where moving the nodes 200 to different positions around the flight chamber 10 is contemplated for varying the system setup, or where removal of the nodes 200 from the flight chamber walls 15 is contemplated for improving views during events like photography/videography shoots.

As seen in FIGS. 3 and 4, adhesive standoffs 238 may be provided on the cover plate 236. The adhesive standoffs 238 may be configured to position the node 200 a specific distance from the flight chamber wall 15 to assist in calibrating the at least one sensor 210. The adhesive standoffs 238 can also help retain the position of the nodes 200 with respect to the flight chamber walls 15 against displacement forces (e.g. persons knocking into the node 200). In embodiments not having separate mounting structures or framework like the node columns 150 (see FIG. 4), the adhesive standoffs 238 provide projections for applying adhesives to securely mount the node housing 230 to the flight chamber wall 15. In this case, the adhesive standoffs 238 can be either reusable or replaceable if changing node locations. Such configurations allow the nodes 200 to be moved to different locations around the flight chamber 10 for modification and customization of the physical setup of the system 100.

For both safety and aerodynamics, it is preferable that neither the nodes 200 nor node mounting structures (e.g. node columns 150) are arranged inside the flight chamber 10 within the tunnel airflow. These elements could introduce undesirable turbulence in the airflow and pose a safety hazard to flyers 50 inside the flight chamber 10 if they were to come loose, as the airflow through the fight chamber 10 is often moving at speeds in excess of 120 miles per hour (about 52 m/s). Any loose parts or debris inside the wind tunnel could potentially cause damage to the structure of the tunnel and/or injury to any flyers 50 using the tunnel at the time. Therefore, the nodes 200 and their housings 230 are arranged outside the flight chamber 10 along the exterior surfaces of the flight chamber walls 15 in the depicted embodiments. However, the scope and spirit of the present disclosure is not necessarily so limited.

Referring again to FIGS. 1 and 6, one or more LED or OLED strips 160 may be arranged along the node columns 150. The LED/OLED strips 160 may be mounted facing toward and/or away from the center of the flight chamber 10. In the depicted embodiments, the LED/OLED strips 160 are arranged facing toward the center of the flight chamber 10, whereby the LED/OLED strips 160 may be configured to: minimize or block the view of the node columns 150 from inside the flight chamber 10 for aesthetic appeal; emit different colors for aesthetics and/or change color in response to the occurrence of certain events and/or user actions inside the flight chamber 10 for interactive functionality; augment the lighting inside the flight chamber 150 for improved visual media capture of users 50 during flight simulation; and/or provide visual markers to assist users 50 in orienting themselves during flight activities or competitions, as well as to assist observers in tracking the flightpath of users 50 in reference to these markers. Likewise, the LED/OLED strips 160 may also minimize or block the view of the node columns 150 from outside the flight chamber 10, emit different colors, and/or change color in response to the occurrence of certain events and/or user actions inside the flight chamber 10, in embodiments where the LED/OLED strips 160 are additionally or alternatively provided along the node columns 150 opposite the flight chamber 10 (e.g., facing toward observation areas around the flight chamber 10 where spectators can observe users 50 flying within the flight chamber 10). The LED/OLED strips 160 may be controlled via signals from the central processor 300 and/or modular controllers 600. It should be appreciated that other types of lighting devices besides LED/OLED strips could instead be used to achieve one or more of the described benefits within the scope and spirit of the present disclosure.

In some embodiments (not specifically shown), the light source 220 may be decoupled from the individual nodes 200, at least in terms of being contained within a defined node structure like housing 230. For example, the sensors 210 may be positioned proximate to LED/OLED strips 160. Segments of LED/OLED strips 160 corresponding to the location of the sensors 210 may be controlled by the central processor 300 and/or modular controller 600 and operated in the same manner as the light sources 220 (e.g. turned on or off, directed to flash and/or change color, etc.). In other words, such LED/OLED strips 160 are the light sources 220 of the system 100 which provide visual indication to user 50 as described herein. Each LED/OLED strip 160 may be associated with a single sensor 210, or multiple sensors 210 where different segments of the same LED/OLED strip 160 are individually controlled. In this case, the location of an individual node 200 may be characterized by the location of its at least one sensor 210, since a single LED/OLED strip 160 may comprise sensors 210 of multiple nodes 200. Yet this system architecture may still be modularly controlled within the spirit and scope of the present disclosure. It should be appreciated that the LED/OLED strip 160 could be provided as a separate component in such embodiments, and not necessarily associated with a node column 150 as previously shown and described.

Figure 7:
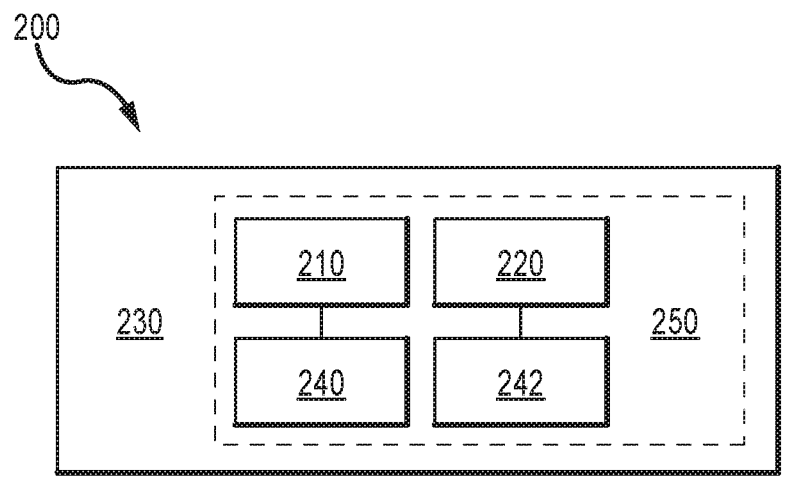
FIG. 7 shows a schematic diagram of an embodiment of a wireless node having an internal power source.
Figure 8:
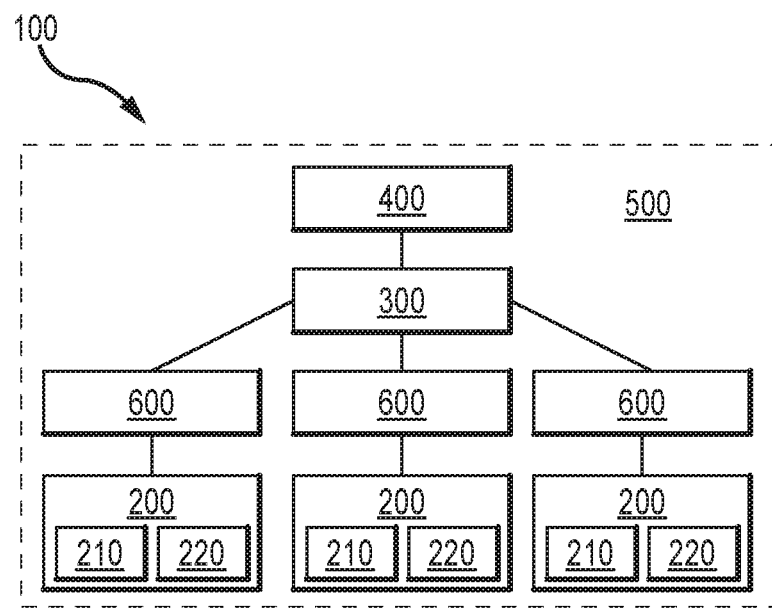
FIG. 8 shows a schematic diagram of an embodiment of the interactive modular sensor system comprising physical network connections, with modular controllers.
Figure 9:
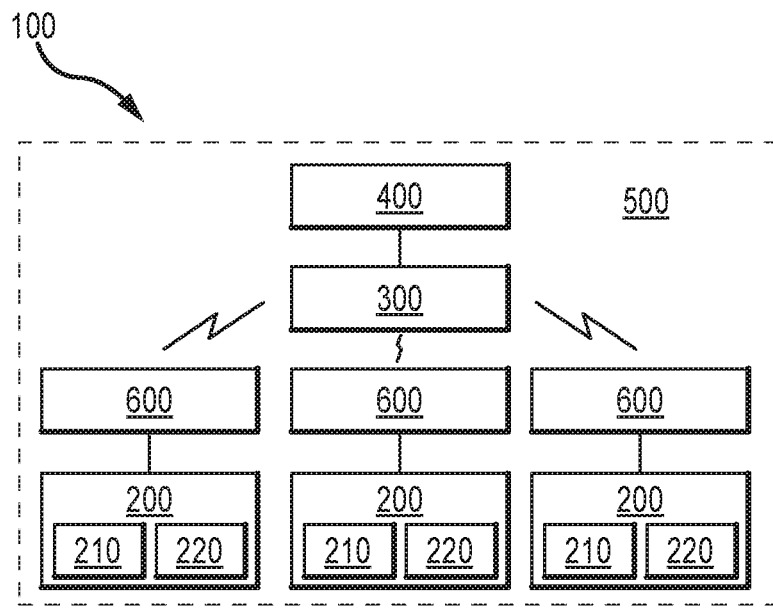
FIG. 9 shows a schematic diagram of an embodiment of the interactive modular sensor system comprising both physical and wireless network connections, with modular controllers.

Referring now to FIG. 7, the nodes 200 may comprise an internal power source 250 (e.g. battery) to supply power to the components thereof, particularly where the network 500 is otherwise wireless and running power cables to nodes 200 mounted around the flight chamber 10 would be undesirable for practical or aesthetic reasons. For example, one or more batteries 250 may be selected in view of component compatibility/requirements and provided within the node housing 230. As seen in the depicted embodiment, a node transmitter 240 and receiver 242 are provided to wirelessly transmit output signals from the at least one sensor 210 and control signals to the light source 220, respectively, over the network 500. In other embodiments, an external power supply may be cabled with any physical network connections between the nodes 200 and the central processor 300 and/or modular controllers 600. For example, each node column 150 may comprise an internal channel which forms an electrical conduit for concurrently routing power and/or signal transmission cabling to the nodes 200 (see FIG. 6). Further, the nodes 200 could have both internal and external power sources, including different configurations from other nodes 200 within the same system 100. For example, power cables may be run to nodes 200 at or near the floor and/or ceiling, with nodes 200 located around center portions of the flight chamber 10 using battery power.

Figure 10:
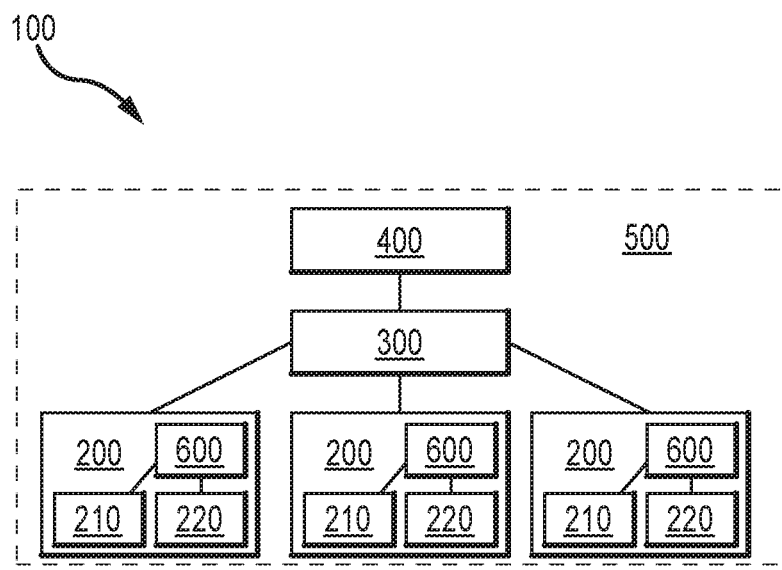
FIG. 10 shows a schematic diagram of an embodiment of the interactive modular sensor system comprising physical network connections, wherein modular controllers are integrated onboard the nodes.
Figure 11:
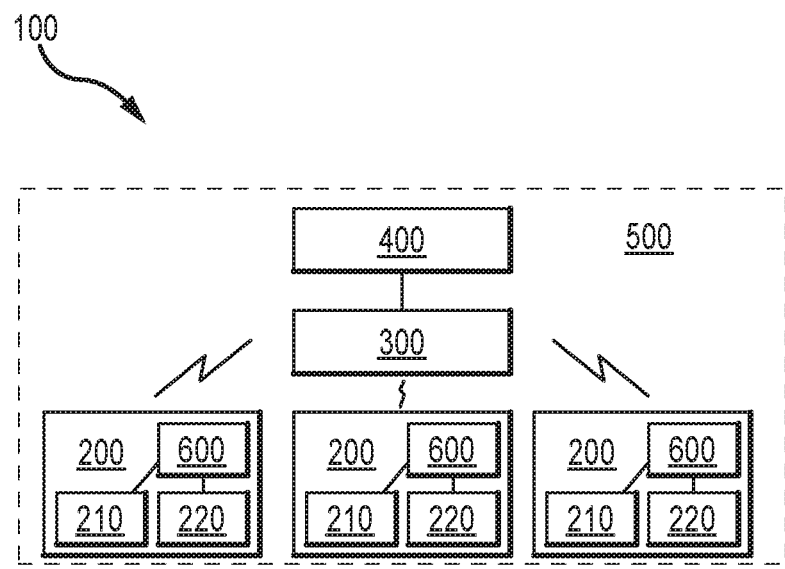
FIG. 11 shows a schematic diagram of an embodiment of the interactive modular sensor system comprising both physical and wireless network connections, wherein modular controllers are integrated onboard the nodes.
Figure 12:
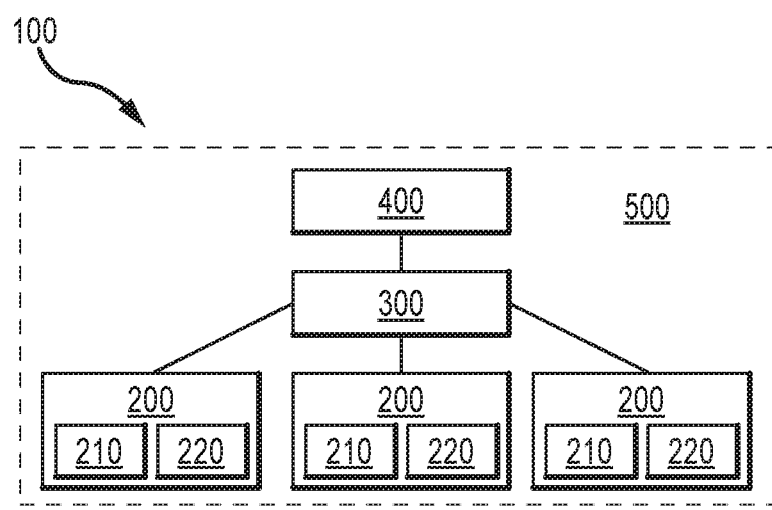
FIG. 12 shows a schematic diagram of an embodiment of the interactive modular sensor system comprising physical network connections, without modular controllers.
Figure 13:
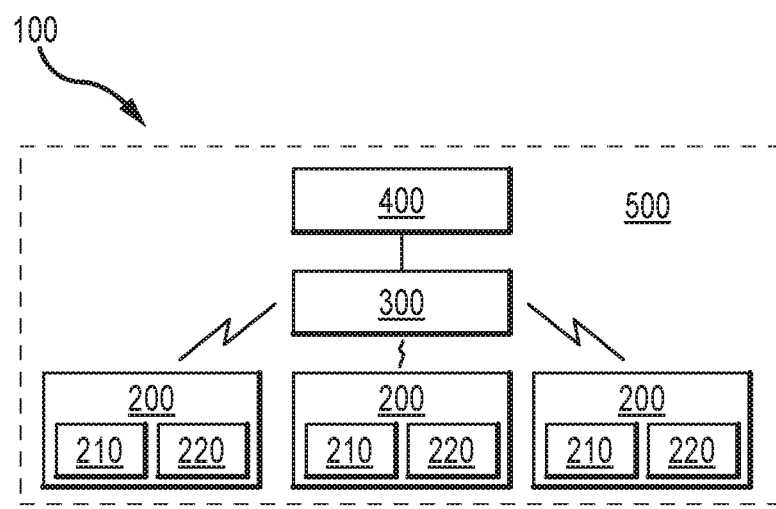
FIG. 13 shows a schematic diagram of an embodiment of the interactive modular sensor system comprising both physical and wireless network connections, without modular controllers.

Turning now to intra-tunnel system communications, FIGS. 8 through 13 show schematic diagrams of various network configurations for the system 100. In FIGS. 8 through 11, the system 100 comprises a plurality of modular controllers 600. Each modular controller may be assigned to one or more of the plurality of nodes 200. The modular controllers 600 may be programmable logic controllers (PLCs), for example, or any other suitable processor-based controller or computer capable of executing a control logic, such as single-board microcontrollers (e.g. Arduino) or single-board computers (e.g. Raspberry Pi). Each modular controller 600 is in communication with its node(s) 200 and the central processor 300 over the network 500. The modular controllers 600 may run a control logic that monitors for when the at least one sensor 210 has detected an input signal and transmits an output signal to the modular controller 600 (e.g. when the user 50 triggers the at least one sensor 210), records relevant data (e.g. points and timestamps), and controls the operation of the light source 220 (e.g. flashing or changing color), as well as any other system components for sensory feedback as described below. The modular controllers 600 communicate this information to the central processor 300—which then processes said information and determines training/game flow sequence and status according to the selected mode of the program—and receive any subsequent instructions from the central processor 300 for its specific node 200. As seen in FIGS. 10 and 11, the modular controllers 600 may be integrated into the nodes 200 (e.g. within housing 230) rather than arranged at a separate location between the nodes 200 and central controller 300 (e.g. within a dropped ceiling plenum space). Each of the plurality of nodes 200 and/or modular controllers 600 could also communicate directly with one another over the network 500 if desired for certain applications, whereby the modular controllers 600 of the plurality of nodes 200 may form a decentralized mesh configuration with no defined central processor 300 present in the system 100. Other embodiments may lack separate modular controllers 600 (see FIGS. 12 and 13), with the above-described functionality of the modular controllers 600 being performed by the central processor 300.

The central processor 300 is configured to execute a program initiated by input from the user terminal 400. The user terminal 400 provides an interface for a person (e.g. tunnel operator) to run the program, select a particular mode (e.g. training exercise, game, competition, etc.), and display information back to the person (e.g. scoring, timers, status, etc.). The program determines and controls the activity of the system 100 depending on the particular mode selected and/or on the feedback received from the nodes 200. Therefore, the central controller 300 communicates with the plurality of nodes 200 either directly (see FIGS. 12 and 13) or indirectly through the modular controllers 600 (see FIGS. 8 through 10) in coordinating the sequence and timing for node activation or deactivation. The central processor 300 may be a separate device from the user terminal 400 or integrated with the user terminal 400 as a single device. For example, the central processor 300 could be a master PLC, microcontroller, single-board computer, consumer PC or any other type of computer or processor-based controller with sufficient processing resources to execute the program, process communications, and control node operability.

The term "network" is used to generally describe the communicative connections between the various components 200, 300, 400, 600 of the system 100. In FIGS. 8 through 13, the network 500 is depicted by broken lines encompassing the other components 200, 300, 400, 600 of the system 100. In some embodiments, the network 500 is formed by physical connections (see FIGS. 8, 10 and 12 wherein physical connections are illustrated by solid lines between components). The physical connections may comprise, for example, electrical or fiberoptic cables, or any other type of communicative connection capable of transmitting information over the network 500. The network 500 may also be completely or partially wireless in other embodiments (see FIGS. 9, 11 and 13 wherein certain physical connections have been replaced by wireless connections). In wireless embodiments of the network 500, transmitters and receivers send and receive, respectively, information between components in communication via wireless connections over the network 500. The transmitters and receivers for system components 200, 300, 400, 600 may use radio transmission, Bluetooth, or Wi-Fi, including any combination thereof, or any other suitable wireless technology, platform, or medium that is capable of processing wireless communication requests and responses in a sufficiently reactive manner for the needs of the system 100.

With the foregoing system architecture in mind, the following describes the operation of an interactive modular system 100 within an indoor skydiving wind tunnel according to the present disclosure. As mentioned above, a person (e.g. facility staff) may interface with the user terminal 400 to initiate a program executed by the central controller 300. For example, the program may comprise a software application including a variety of modes such as different games, challenges, training exercises and competition rules. The program may be configured to provide an interface display for input into the user terminal 400 and communicate information, commands and requests over the network 500 between the user terminal 400 and the plurality of nodes 200 via the central controller 300 in response to said input from the user terminal 400 and to the movements of a user 50 within the flight chamber 10. The program could also interface with other programs to accomplish the same. The mode selected determines the behavior of the components of the system 100. For example, each packet of data exchanged between the central controller 300 and the modular controllers 600 and/or the nodes 200 can comprise any number of information depending on the program mode selected (e.g. a data packet in one game may include time stamp information or elapsed time information, while a data packet for another game may include information regarding sensor signal count or light source emission color). And the receipt of a data packet or lack of receipt of a data packet by the central controller 300 from one or more nodes 200 may be used to determine how the system 100 and components thereof react according to the control logic of the selected program mode. Therefore, any conceivable number of modes, and activities and objectives thereof, are possible using the same architecture of the system 100. Moreover, the setup for a particular modes is further customizable given the modularity and capacity for independent functionality of each node 200, and the ability to rearrange the positional relationship of the plurality of nodes 200 around the flight chamber 10 as desired in certain embodiments, as well as the option to utilize one or more different types of sensors 210 and light sources 220 therein (which can enable different sensor "triggering events" and visual indications).

For example, one mode of the program may direct the user 50 to "touch" (or otherwise trigger), the proximity sensors 212 of the plurality of nodes 200 in a particular order. The light sources 220 will visually communicate to the user 50 which node 200 is currently activated and when said node 200 has been satisfied, for instance by changing colors (e.g. from red to blue or vice versa), by alternating between a flashing and constant emission state, or by turning on/off. In a related mode, the program may utilize a timer for tracking how long it takes the user 50 to complete a particular sequence of nodes 200, or counter for tracking how many nodes 200 the user 50 is able to trigger within a set period of time. Likewise, a program mode may be configured to terminate if the user 50 fails to satisfy a specific node 200 or complete a particular order of nodes 200 within a set period of time, or if a sensor detection signal is received from an incorrect node 200 (i.e. if the user 50 activates the wrong sensor 210). Another program mode may generate a random pattern or sequence of nodes 200 that the user 50 is then challenged to recreate by memory. It should be apparent that any number of games, challenges, training exercises, and the like may be provided by different program modes for the interactive modular system 100 within the scope and spirit of the present disclosure. Further, the timing and sequence of nodes 200 of each program mode may be adjustable to different difficulty levels as desired.

Further, certain program modes may be configured for use of the system 100 by more than one flyer 50 navigating the flight chamber 10. For example, a training exercise may visually instruct and coordinate the location of different flyers 50 within the flight chamber 10 by light source 220 color or activity, which could be desirable in practicing choreographed routines and group maneuvers. Likewise, a game may distribute nodes 200 between two or more teams (which may be indicated by the color of the light emitted by the light sources 220) and each team of one or more flyers 50 may need to activate or deactivate its nodes 200 first, or the other nodes 200 of the other team or teams first, or any other combination of possible challenges and objectives using the setup of a system 100 according to the present disclosure.

Where the at least one sensor 210 includes a through-beam sensor 214 with corresponding through-beam emitter 216, the flyer 50 could be trying to avoid breaking one or more crossbeams 218 arranged within the flight chamber 10. In this way, the crossbeam 218 between two paired nodes 200 forms an obstacle to be avoided as the flyer 50 navigates the flight chamber 10 to accomplish an objective (e.g. activating other nodes 200) or in the performance of tricks and other maneuvers. It should be appreciated that the crossbeam 218 provides a virtual rather than a physical obstacle, for example, such as placing a physical object in the flight chamber 10 which would then present a potential safety hazard and create undesirable airflow turbulence. In other embodiments, the flyer 50 may be actively trying to break one or more crossbeams 218 to complete an objective, for example, by making the location of the crossbeam 218 in the flight chamber 10 places where the flyer 50 must pass through. The program may track the number of crossbeam-avoidance violations committed by the flyer 50 and deduct points or terminate the activity, and/or the number of crossbeam-break targets achieved by the flyer 50 and add points or allow the activity to continue, depending on the selected program mode. Any combination of these two through-beam configurations (must break the crossbeam 218; must not break the crossbeam 218) could be used by a particular program mode, as well as through-beam configurations incorporating one or more single-node proximity sensors 212. This allows an obstacle course to be set up inside the flight chamber 10 without presenting a safety hazard to flyers 50.

Figure 14:
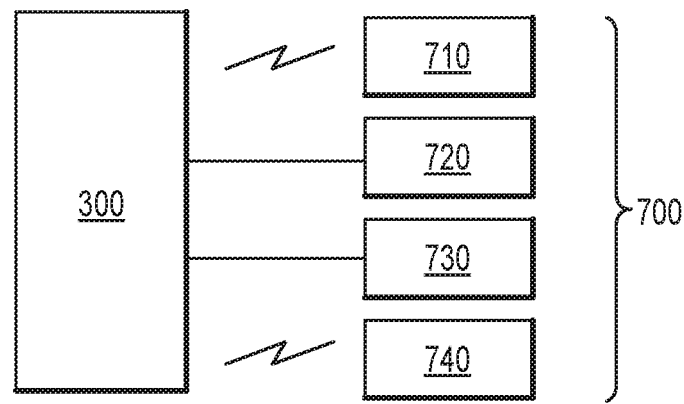
FIG. 14 shows a partial schematic diagram of an embodiment of the interactive modular sensor system comprising supplemental sensory components.

As seen in FIG. 14, the system 100 may further comprise one or more supplemental sensory components 700, which interact with users 50 in the flight chamber 10 and/or observers in facility viewing areas, to communicate information via sensory indication, including haptic, auditory, or visual. For instance, flyers 50 may wear a haptic device 710 (e.g. stimulating pad, glove, wristband, or other article) configured to output feedback (e.g. vibration) to the wearer, which could indicate when a node 200 has been activated or deactivated, or when a program mode has commenced or terminated. This haptic device 710 may receive and operate according to control signals from the central controller 300, modular controllers 600, and/or the plurality of nodes 200 that are wirelessly transmitted over the network 500 to reach the flyer 50 within the flight chamber 10. In this way, an additional sensory indicator (besides the visual indication of the light sources 220) is provided to the flyer 50, which could be beneficial for letting the flyer 50 know that some action is currently required when an active visual indicator is not in the flyer's field of vision, for example. Incorporating haptic sensation to communicate distinct pieces of information via the haptic component 710 could also be beneficial if the flyer 50 is colorblind and cannot differentiate between certain colors (e.g. in embodiments where the use of different colors is a functional aspect of the program mode). Interactive sensory components may also be provided to spectators in viewing areas of the wind tunnel facility. For instance, one or more display screens 720 may display information from the system 100 regarding program mode status, flight time left or elapsed, live scoring, flyer rankings, etc. One or more speakers 730 may emit interactive sounds to indicate when the flyer 50 performs or fails to perform an action using the system 100, or provide informational announcements regarding program mode status, flight time left or elapsed, live scoring, flyer rankings, etc. Although multiple factors make hearing difficult within the flight chamber 10 while the wind tunnel is operating, these auditory signals could also be transmitted to a flyer 50 wearing wireless earphones or earbuds 740 with adequate noise-cancelling capacity, in recognition that using high device volumes to overcome environmental tunnel noise is not recommended due to the risk of incurring hearing damage. The one or more supplemental sensory components 700 may be physically or wirelessly connected to the central controller 300, modular controllers 600, nodes 200 and/or additional intermediary devices for communication over the network 500, depending on the particular configuration of the system 100, with the exception that components 710, 740 for flyers 50 within the flight chamber 10 are preferably configured for wireless connectivity. For example, in the illustrative embodiment of FIG. 14, the central controller 300 is physically connected to a display screen 720 and a speaker 730, and wirelessly connected to a haptic device 710 and flyer earphones or earbuds 740; it being appreciated that the FIG. 14 only depicts this aspect of the system 100 which can be readily integrated into various system configurations (see FIGS. 8 through 13). Therefore, it should be appreciated that a wide variety of implementations are possible within the scope and spirit of the present disclosure.

Figure 15:
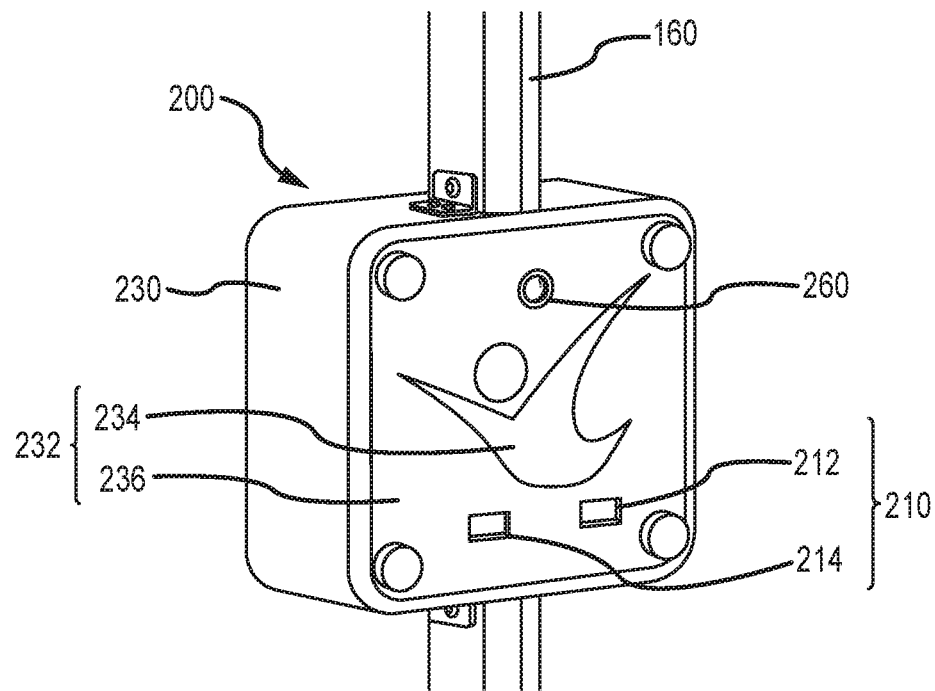
FIG. 15 shows another embodiment of the node of FIG. 3 including an onboard media camera.

Some embodiments of the system 100 may additionally incorporate media capture functionality. For example, one or more nodes 200 may include a camera 260 configured for photography and/or videography (see FIG. 2). Like the at least one sensor 210, the camera 260 is arranged facing the inside of flight chamber 10 to capture media of users 50 flying therein. As seen in the embodiment of FIG. 15, the camera 260 may be provided within the node housing 230 and therefore share the same power supply and/or network communication pathways as other node components 210, 220. Other embodiments may have different arrangements of the one or more cameras 260 (e.g. separately mounted along the node column 150 from the nodes 200, which again allows for concurrent cabling and resource utilization with the nodes 200). The central controller 300 and/or modular controller 600 may control operation of the camera 260. Further, the system 100 may use information from the nodes 200 regarding the position of the user 50 within the flight chamber 10 to select and activate cameras 260 with desirable viewpoints for media capture. Likewise, the camera 260 may transmit captured media to the central controller 300 for subsequent management and dissemination. In other embodiments, the camera 260 may internally retain captured media in device storage (e.g. memory cards), whereby the tunnel personnel would then retrieve the captured media via file transfer. In this way, the system 100 may improve automation of the media capture process, thereby reducing or eliminating the need for personnel to physically perform this function.

Also related to media capture functionality, indoor skydiving competitions sometimes require that flyers 50 make a loop around a virtual line through the center of the flight chamber 10, without actually crossing the line, with a camera outside the flight chamber 10 positionally aligned along this theoretical line to capture video feed of each flight session. Thus, judges can review a video replay of the camera to determine if the flyer 50 crossed the line (e.g. to deduct points). Although the above-described crossbeam 218 could also be used for this purpose, it may be desirable to be able to share the video replay with the members of the audience or remote viewers, as well as to ensure the through-beam sensor 214 did not register a false positive (e.g. through-beam emitter 216 malfunction) in competitive settings. Accordingly, two paired node columns 150 may each have a sight ring 156 (see FIGS. 1 and 6) forming an opening to assist in orienting a temporary camera along a virtual line extending through both openings of the opposing sight rings 156. The sight rings 156 may be aligned along a centerline of the flight chamber 10 in the same horizontal plane. In this way, the node columns 150 can facilitate the setup and transition between competitive and recreational wind tunnel uses.

Figure 16:
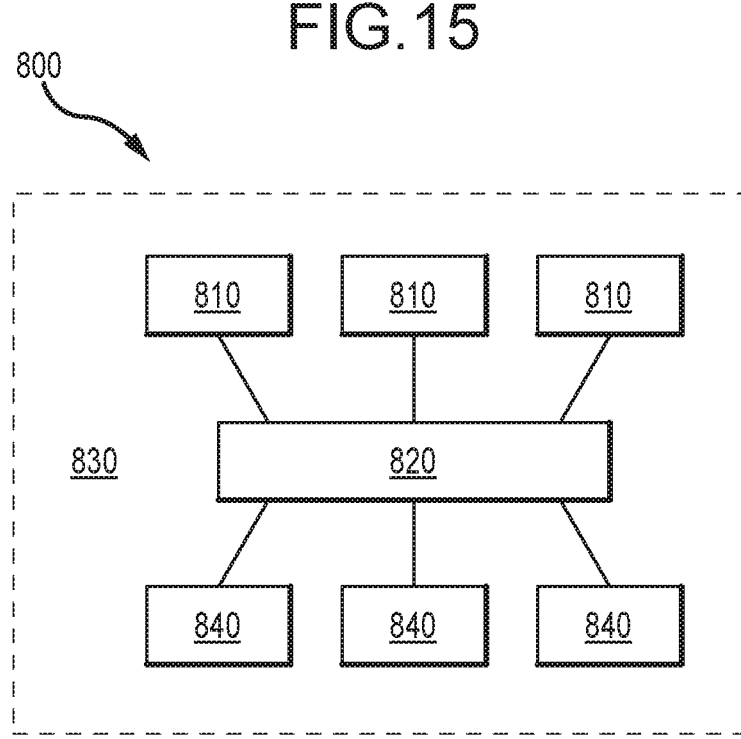
FIG. 16 shows a schematic diagram of an inter-tunnel network system connecting a plurality of intra-tunnel interactive modular sensor systems according to the present disclosure.

The above description has mostly related to an intra-tunnel system 100 in the context of a single wind tunnel facility. Referring now to FIG. 16, a plurality of such intra-tunnel systems 810 according to the present disclosure may be integrated together within a larger inter-tunnel system 800. The inter-tunnel system 800 forms a network 830 connecting multiple intra-tunnel systems 810 from different wind tunnel facilities to a database 820. For instance, the database 820 may be a single server or cloud-based. The database 820 compiles information received from, and may distribute compiled information to, the various intra-tunnel systems 810 of the inter-tunnel system 800. Database management system software facilitates the storage, retrieval, distribution and update of data. The inter-tunnel system 800 further comprises user interfaces 840 that allow persons to interact with the compiled information within the network 840. Such user interfaces 840 may include websites, smartphone applications, and/or wind tunnel facility displays (e.g. display screens 720), for example. APIs may be utilized to facilitate the functional communication of information between various system software programs and hardware components. Network connectivity may be internet-based. With the foregoing data architecture in mind, the inter-tunnel system 800 enables the remote access to and/or sharing of information from individual systems 810, regardless of location. Accordingly, users 50 may be able to view and track their personal scores, performance metrics, or any other stored pieces of data. The system 800 may also incorporate one or more social aspects such as user profiles/messaging, the sharing of flyer rankings/scores, etc. Further, the system 800 can enable the coordination of competitions or other events held across multiple wind tunnel locations in substantially real-time. In this way, the system 800 may further augment the user experience, as well as foster social interaction and community.

While a number of aspects and embodiments have been discussed, those of skill in the art will recognize certain modifications, permutations, additions and sub-combinations therefor. It is thus intended that the following appended claims are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof; it being recognized that various modifications are possible within the scope of the invention claimed. Thus, it should be understood that although the present invention has been specifically disclosed by certain embodiments and optional features, modification and variation of the concepts disclosed herein may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all possible combinations and sub-combinations of the group are intended to be individually included in the disclosure.

In general, the terms and phrases used herein have their art-recognized meaning, which can be found by reference to standard texts, literature, journal references and contexts known to those skilled in the art. The above definitions are provided to clarify their specific use in the context of the invention. It should be appreciated that although the present disclosure is described in terms of "indoor skydiving," the use of such an interactive system in wind tunnels may come to be known under different terminology since it does not necessarily simulate conventional outdoor skydiving.

Possible claims include:

An interactive modular system for a wind tunnel, comprising:
 a plurality of nodes mounted around the flight chamber of the wind tunnel, each node of the plurality of nodes includes at least one sensor and at least one light source;
 the at least one sensor faces the interior of the flight chamber, the at least one sensor is configured to detect an input signal from user movements within the flight chamber and generate an output signal in response to the input signal;
 the at least one light source is configured to change visual appearance between at least two states;
 a network communicatively connects the plurality of nodes to a central processor, the central processor runs a program which coordinates activity of the plurality of nodes; and
 the program determines the at least two states of the light sources of the plurality of nodes in response to output signals received from the sensors of the plurality of nodes.

The system of claim 1, wherein the at least one sensor of one or more nodes includes a proximity sensor, and the proximity sensor detects when a user is close to the proximity sensor and generates an output signal if the user comes within a set distance of the proximity sensor.

The system of claim 2, wherein the proximity sensor is a photoelectric reflective sensor.

The system of any of the preceding claims, wherein the at least one sensor of one or more nodes includes a through-beam sensor, and the through-beam sensor detects a crossbeam emitted by a through-beam emitter through the flight chamber and generates an output signal if a user breaks the crossbeam.

The system of claim 4, wherein the through-beam sensor is a photoelectric sensor and the crossbeam is a laser beam.

The system of claim 4 or 5, wherein a first node is arranged opposing a second node across the flight chamber, the first node includes the through-beam emitter and the second node includes the through-beam sensor.

The system of any of claims 4 through 6, further comprising multiple crossbeams formed between through-beam sensors and through-beam emitters of opposing nodes across the flight chamber.

The system of any of the preceding claims, wherein the at least one light source of one or more nodes comprises one or more LED or OLED strips.

The system of any of the preceding claims, wherein the at least one light source changes color between the at least two states.

The system of any of the preceding claims, wherein each node of the plurality of nodes comprises a housing positioned along an exterior surface of a flight chamber wall, the housing contains the at least one sensor and the at least one light source, and the housing includes a visual indicator portion configured to convey the at least two states of the at least one light source to user(s) within the flight chamber.

The system of claim 10, wherein the housing includes another visual indicator portion configured to convey the at least two states of the at least one light source to spectator(s) outside the flight chamber.

The system of any of the preceding claims, further comprising one or more node columns provided around the flight chamber, wherein the nodes are mounted to the one or more node columns, and the one or more node columns form electrical conduits for routing power and/or signal transmission cabling to the nodes mounted to each node column.

The system of claim 12, wherein the one or more node columns comprise four node columns arranged around the flight chamber, each node column comprises three nodes, and each node corresponds to another node of an opposing node column.

The system of claim of any of the preceding claims, wherein the network comprises physical connections between the plurality of nodes and the central processor.

The system of claim of any of the preceding claims, wherein the plurality of nodes each comprise an internal power source, a transmitter and a receiver, the internal power source provides power to node components, the transmitter is communicatively connected to the at least one sensor, the receiver is communicatively connected to the at least one light source, and the network includes wireless signal transmission between the plurality of nodes and the central processor.

The system of claim of any of the preceding claims, further comprising a plurality of modular controllers, each node of the plurality of nodes communicatively connected to the central controller via a modular controller of the plurality of modular controllers.

The system of claim of any of the preceding claims, further comprising a user terminal which provides an interface for a person to run the program and select a program mode, wherein the program includes multiple program modes having different user objectives or rules.

An inter-tunnel system comprising a network connecting multiple systems according to any of the preceding claims, wherein the inter-tunnel system compiles and stores information received from each of the intra-tunnel systems, and the inter-tunnel system enables user access to said information via user interfaces.

A method of using an interactive modular system for a wind tunnel, the interactive modular system including a plurality of nodes arranged along a flight chamber of the wind tunnel, comprising the steps of:
  initiating a program via user input into a user terminal connected to a central controller;
  communicating, over a network, a first signal from the central controller to a first node selected by the program;
  activating, via the first signal, a light source of the first node; and
  changing the appearance of the light source of the first node in response to a sensor of the first node detecting user movement within the flight chamber.

The method of claim 20, further comprising the steps of:
  communicating, over the network, a second signal from the first node to the central controller, the second signal generated in response to the sensor of the first node detecting user movement within the flight chamber;
  selecting, via the program, a second node based on receipt of the second signal;
  communicating, over the network, a third signal from the central controller to the second node selected by the program; and
  activating, via the third signal, a light source of the second node.

REFERENCE NUMERALS

10 flight chamber
15 flight chamber wall
50 user or flyer
100 system
150 node column
152 column mounting bracket
154 node mounting bracket
156 column sight ring
160 LED or OLED strip
200 node
210 sensor
212 proximity sensor
214 through-beam sensor
216 through-beam emitter
218 through-beam or crossbeam
220 light source
230 housing
232 visual indicator portion
234 diffusion plate
236 cover plate
238 adhesive standoff
240 wireless transmitter
242 wireless receiver
250 internal power source
260 camera
300 central controller or processor
400 user terminal
500 network
600 modular controller 700 supplemental sensory components
710 haptic device
720 display screen
730 speaker
740 earphones or earbuds
800 inter-tunnel system
810 intra-tunnel system
820 database
830 network
840 user interfaces

The invention claimed is:

1. An interactive modular system for a wind tunnel, comprising:
- a plurality of nodes mounted around the flight chamber of the wind tunnel, each node of the plurality of nodes includes at least one sensor and at least one light source;
- the at least one sensor faces the interior of the flight chamber, the at least one sensor is configured to detect an input signal from user movements within the flight chamber and generate an output signal in response to the input signal;
- the at least one light source is configured to change visual appearance between at least two states;
- a network communicatively connects the plurality of nodes to a central processor, the central processor runs a program which coordinates activity of the plurality of nodes; and
- the program determines the at least two states of the light sources of the plurality of nodes in response to output signals received from the sensors of the plurality of nodes.

2. The system of claim 1, wherein the at least one sensor of one or more nodes of the plurality of nodes includes a proximity sensor, and the proximity sensor detects when a user is close to the proximity sensor and generates an output signal if the user comes within a set distance of the proximity sensor.

3. The system of claim 2, wherein the proximity sensor is a photoelectric reflective sensor.

4. The system of claim 1, wherein the at least one sensor of one or more nodes of the plurality of nodes includes a through-beam sensor, and the through-beam sensor detects a crossbeam emitted by a through-beam emitter through the flight chamber and generates an output signal if a user breaks the crossbeam.

5. The system of claim 4, wherein the through-beam sensor is a photoelectric sensor and the crossbeam is a laser beam.

6. The system of claim 4, wherein a first node is arranged opposing a second node across the flight chamber, the first node includes the through-beam emitter and the second node includes the through-beam sensor.

7. The system of claim 4, further comprising multiple crossbeams formed between through-beam sensors and through-beam emitters of opposing nodes across the flight chamber.

8. The system of claim 1, wherein the at least one light source of one or more nodes comprises one or more LED or OLED strips.

9. The system of claim 1, wherein the at least one light source changes color between the at least two states.

10. The system of claim 1, wherein each node of the plurality of nodes comprises a housing positioned along an exterior surface of a flight chamber wall, the housing contains the at least one sensor and the at least one light source, and the housing includes a visual indicator portion configured to convey the at least two states of the at least one light source to user(s) within the flight chamber.

11. The system of claim 10, wherein the housing includes another visual indicator portion configured to convey the at least two states of the at least one light source to spectator(s) outside the flight chamber.

12. The system of claim 1, further comprising one or more node columns provided around the flight chamber, wherein the nodes are mounted to the one or more node columns, and the one or more node columns form electrical conduits for routing power and/or signal transmission cabling to the nodes mounted to each node column.

13. The system of claim 12, wherein the one or more node columns comprise four node columns arranged around the flight chamber, each node column comprises three nodes, and each node corresponds to another node of an opposing node column.

14. The system of claim 1, wherein the network comprises physical connections between the plurality of nodes and the central processor.

15. The system of claim 1, wherein the plurality of nodes each comprise an internal power source, a transmitter and a receiver, the internal power source provides power to node components, the transmitter is communicatively connected to the at least one sensor, the receiver is communicatively connected to the at least one light source, and the network includes wireless signal transmission between the plurality of nodes and the central processor.

16. The system of claim 1, further comprising a plurality of modular controllers, each node of the plurality of nodes communicatively connected to the central controller via a modular controller of the plurality of modular controllers.

17. The system of claim 1, further comprising a user terminal which provides an interface for a person to run the program and select a program mode, wherein the program includes multiple program modes having different user objectives or rules.

18. An inter-tunnel system comprising a network connecting multiple systems according to claim 1, wherein the inter-tunnel system compiles and stores information received from each of the intra-tunnel systems, and the inter-tunnel system enables user access to said information via user interfaces.

19. A method of using an interactive modular system for a wind tunnel, the interactive modular system including a plurality of nodes arranged along a flight chamber of the wind tunnel, comprising the steps of:
- initiating a program via user input into a user terminal connected to a central controller;
- communicating, over a network, a first signal from the central controller to a first node selected by the program;
- activating, via the first signal, a light source of the first node; and
- changing the appearance of the light source of the first node in response to a sensor of the first node detecting user movement within the flight chamber.

20. The method of claim 19, further comprising the steps of:
- communicating, over the network, a second signal from the first node to the central controller, the second signal generated in response to the sensor of the first node detecting user movement within the flight chamber;
- selecting, via the program, a second node based on receipt of the second signal;

communicating, over the network, a third signal from the central controller to the second node selected by the program; and activating, via the third signal, a light source of the second node.

* * * * *